United States Patent [19]

Nakajima et al.

[11] 3,721,705

[45] March 20, 1973

[54] PROCESS FOR PRODUCING METHACRYLIC ACID OR ITS ESTERS

[75] Inventors: Hitoshi Nakajima, Ageoshi; Masazumi Chono, Saitamaken; Masayoshi Taguchi, Itabashiku; Tokio Sakurai, Kawagoe; Noriaki Matsuo, Itabashiku, all of Japan

[73] Assignee: Asahi Kasei Kogyo Kabushiki Kaisha, Osaka, Japan

[22] Filed: June 11, 1971

[21] Appl. No.: 152,381

[30] Foreign Application Priority Data

June 18, 1970 Japan..............................45/52388
Dec. 15, 1970 Japan..........................45/111304

[52] U.S. Cl............................260/486 D, 260/526 N
[51] Int. Cl...............................................C07c 69/54
[58] Field of Search......................260/486 D, 526 N

[56] References Cited

UNITED STATES PATENTS 2,111,509  3/1938  Loder................................260/486 D
2,378,501  6/1945  Ratchford et al.................260/482 D Primary Examiner—Lorraine A. Weinberger
Assistant Examiner—Paul J. Killos
Attorney—James E. Armstrong et al.

[57] ABSTRACT

Methacrylic acid or its esters is produced by reacting one part by mole of isobutyric acid or its esters, for example, methyl isobutyrate, ethyl isobutyrate, propyl isobutyrate and butyl isobutyrate with 0.1 to 30 parts by mole, preferably 0.2 to 1 part by mole of sulfur vapor at a temperature of 300° – 700° C.

6 Claims, No Drawings

PROCESS FOR PRODUCING METHACRYLIC ACID OR ITS ESTERS

This invention relates to a process for producing methacrylic acid or its esters by reaction of isobutyric acid or its esters with sulfur vapor.

Heretofore, various processes have been proposed for the production of methacrylic acid or its esters from isobutyric acid or its esters. For example, a process for producing methacrylic acid ester by dehydrogenating an isobutyric acid ester in the presence of iodine is well known (U.S. Pat. No. 2,719,171; Japanese Pat. publication No. 7208/68; Japanese Pat. publication No. 12902/63; Japanese Pat. publication No. 21613/65). A process based on oxidative dehydrogenation in the presence of sulfur vapor as a catalyst is well known (Japanese Pat. publication No. 8208/69). Furthermore, a process based on dehydrogenation by a solid catalyst is well known (U.S. Pat. No. 2,945,057).

On the other hand, a process for producing methacrylic acid, for example, by dehydrogenating isobutyric acid in the presence of a hydrogen iodide hydrate catalyst is well known (Japanese Pat. publication No. 26484/68).

Further, a process based on the dehydrogenation in the presence of a solid catalyst is well known (U.S. Pat. No. 3,370,087).

However, in the process based on the dehydrogenation in the presence of iodine or hydrogen iodide hydrate, selectivity of methacrylic acid or its esters is limited even when a large amount of iodine or hydrogen iodide hydrate is used, and said process is thus not preferable in an economical sense. Furthermore, the processes based on the solid catalyst have such a disadvantage that the yield of methacrylic acid or its esters is very low. On the other hand, when the sulfur is used as a catalyst, there is such a disadvantage that a selectivity of methacrylic acid ester is lower, because of the oxidative dehydrogenation reaction based on a reaction between isobutyric acid ester and oxygen.

The present inventors have made studies on a process for producing methacrylic acid or its esters from isobutyric acid or its esters, and as a result have found that the methacrylic acid or its esters can be produced with a high selectivity by reacting isobutyric acid or its esters with sulfur vapor according to the following formula, and have accomplished the present invention:

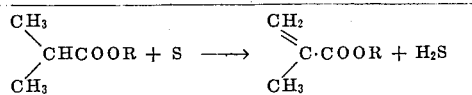

wherein R is represented by $C_nH_{2n+1}$ ($n = 0-8$).

That is to say, an object of the present invention is to provide a process for producing methacrylic acid or its esters from isobutyric acid or its esters, by reacting isobutyric acid or its ester with sulfur vapor at a temperature of 300° – 700° C.

When, for example, methyl isobutyrate is reacted with sulfur vapor in the present invention, it will be clear from the following examples and comparative examples that methyl methacrylate can be produced with a high selectivity as compared with other processes.

| Additive | Reaction conditions | | | | | Reaction Result | | |
|---|---|---|---|---|---|---|---|---|
| | Reaction temperature, °C. | MIB partial pressure, percent | S/MIB (mole ratio) | I₂/MIB (mole ratio) | O₂/MIB (mole ratio) | MIB conversion, percent | MMA one pass yield, percent | MMA selectivity, percent |
| S | 500 | 32.0 | 0.3 | | | 8.1 | 6.5 | 80.3 |
| S | 580 | 32.0 | 0.005 | | | | Trace | |
| S | 580 | 32.0 | 0.08 | | | | 1.3 | |
| O₂ plus I₂ | 500 | 32.0 | | 0.005 | 0.4 | 30.3 | 13.5 | 45.5 |
| O₂ plus S | 500 | 32.0 | 0.1 | | 0.4 | 25.1 | 14.2 | 56.8 |

The abbreviation "MIB" represents methyl isobutyrate and the abbreviation "MMA" represents methyl methacrylate.

The starting material used in the present invention is isobutyric acid and its esters, and the products are methacrylic acid and its esters corresponding to the starting materials. For example, the following products are produced from the following corresponding starting materials: methyl methacrylate is formed from methyl isobutyrate; ethyl methacrylate from ethyl isobutyrate; propyl methacrylate from propyl isobutyrate; isopropyl methacrylate from isopropyl isobutyrate; butyl methacrylate from butyl isobutyrate; isobutyl methacrylate from isobutyl isobutyrate; methacrylic acid from isobutyric acid.

In carrying out the present invention, a composition of the raw materials used in the reaction is as follows: 0.1 to 30 parts by mole, particularly preferably 0.2 to 1.0 part by mole, of sulfur vapor is used per one part by mole of isobutyric acid or its esters. When less than 0.1 part by mole of sulfur vapor is supplied to the reaction system, the yields of methacrylic acid and its ester are considerably decreased, as seen from said comparative examples, and thus such a short supply of sulfur vapor is not preferable.

On the other hand, when more than 30 parts by mole of sulfur vapor is supplied to the reaction system, methacrylic acid and its esters are decomposed and the side reaction takes place vigorously, and the yields are lowered. Thus, such an excess supply of sulfur vapor is not preferable.

Preferable reaction temperature used in carrying out the present invention ranges from 300° to 700° C. Though the methacrylic acid and its esters are formed beyond said temperature range, the yields of methacrylic acid and its esters are considerably lowered when the reaction temperature is lower than 300° C. When the reaction temperature is higher than 700° C, the methacrylic acid and its esters are decomposed, and the side reaction takes place vigorously.

So long as a gaseous phase can be maintained under the reaction conditions, any of an increased, atmospheric or reduced pressures can be used as the reaction pressure.

In carrying out the present invention, an inert gas can be present in the reaction system, but it is not always necessary.

The present invention will be now explained in detail, referring to following non-limitative examples.

Example 1

Raschig rings were packed in a quartz glass reactor tube as a heat transfer medium, and the tube was kept at 500° C in a tubular electric furnace. Then, a gas mixture of methyl isobutyrate, sulfur vapor and nitrogen (32:8:60 by volume) was passed therethrough at a space velocity of 150 hr$^{-1}$. Effluent gas composition was analyzed by gas chromatography, whereby it was found that the conversion of methyl isobutyrate was 7.6 percent, and the yield of methyl methacrylate based on the converted methyl isobutyrate was 81.8 percent.

Comparative Example 1

The following reaction was carried out under the same conditions as in Example 1. A gas mixture of methyl isobutyrate and nitrogen (32:68 by volume) was passed through the reactor tube at a space velocity of 150 hr$^{-1}$. As a result of the reaction, no methyl methacrylate was found.

Example 2

The reactor tube was kept at 520° C in the same manner as in Example 1. Then, a gas mixture of ethyl isobutyrate, sulfur vapor and nitrogen (32:10:58 by volume) was passed therethrough at a space velocity of 200 hr$^{-1}$. At that time, the conversion of ethyl isobutyrate was 11.5 percent, and the yield of ethyl methacrylate based on the converted ethyl isobutyrate was 78.5 percent.

Example 3

The reactor tube was kept at 500° C in the same manner as in Example 1. Then, a gas mixture of methyl isobutyrate, sulfur vapor and nitrogen (30:30:40 by volume) was passed therethrough at a space velocity of 150 hr$^{-1}$. At that time, the conversion of methyl isobutyrate was 12.3 percent, and the yield of methyl methacrylate based on the converted methyl isobutyrate was 76.8 percent.

Example 4

The reactor tube was kept at 490° C in the same manner as in Example 1. Then, a gas mixture of n-butyl isobutyrate, sulfur vapor and nitrogen (30:10:60 by volume) was passed therethrough at a space velocity of 150 hr$^{-1}$. At that time, the conversion of n-butyl isobutyrate was 6.8 percent, and the yield of n-butyl methacrylate based on the converted n-butyl isobutyrate was 72.5 percent.

Example 5

The reactor tube was kept at 500° C in the same manner as in Example 1. Then, a gas mixture of isobutyric acid, sulfur vapor and nitrogen (30:10:60 by volume) was passed therethrough at a space velocity of 150 hr$^{-1}$. At that time, the conversion of isobutyric acid was 4.8 percent, and the yield of methacrylic acid based on the converted isobutyric acid was 72.8 percent.

Comparative Example 2

The following reaction was carried out under the same conditions as in Example 1. A gas mixture of isobutyric acid and nitrogen (30:70 by volume) was passed through the reactor tube at a space velocity of 150 hr$^{-1}$. As a result of the reaction, no methacrylic acid was found.

What is claimed is:

1. A process for producing methacrylic acid or an ester thereof comprising
   a. forming an oxygen-free gaseous mixture of isobutyric acid or an ester thereof and sulfur vapor, the sulfur being present in an amount of 0.1 to 30 moles per mole of acid or ester, and
   b. allowing the mixture to react under oxygen-free conditions at a temperature of 300°–700° C.

2. A process according to claim 1 wherein the reactant ester is methyl isobutyrate.

3. A process according to claim 1 wherein the reactant ester is ethyl isobutyrate.

4. A process according to claim 1 wherein the reactant ester is propyl isobutyrate.

5. A process according to claim 1 wherein the reactant ester is butyl isobutyrate.

6. A process according to claim 1 wherein the sulfur is present in the amount of 0.2—1 moles per mole of acid or ester.

* * * * *